(12) United States Patent
Liao et al.

(10) Patent No.: US 9,081,401 B2
(45) Date of Patent: Jul. 14, 2015

(54) SWITCHING REGULATOR AND CONTROL CIRCUIT AND CONTROL METHOD THEREOF

(71) Applicants: Chia-Wei Liao, Zhubei (TW); Leng-Nien Hsiu, Zhubei (JP); Pei-Yuan Chen, Taoyuan (TW); Roland Van Roy, Eindhoven (NL); Jing-Meng Liu, Zhubei (TW)

(72) Inventors: Chia-Wei Liao, Zhubei (TW); Leng-Nien Hsiu, Zhubei (JP); Pei-Yuan Chen, Taoyuan (TW); Roland Van Roy, Eindhoven (NL); Jing-Meng Liu, Zhubei (TW)

(73) Assignee: RICHTEK TECHNOLOGY CORPORATION, Chupei, Hsin-Chu (TW)

( * ) Notice: Subject to any disclaimer, the term of this patent is extended or adjusted under 35 U.S.C. 154(b) by 335 days.

(21) Appl. No.: 13/728,605

(22) Filed: Dec. 27, 2012

(65) Prior Publication Data

US 2013/0169252 A1 Jul. 4, 2013

Related U.S. Application Data

(60) Provisional application No. 61/581,712, filed on Dec. 30, 2011.

(51) Int. Cl.
*G05F 1/00* (2006.01)
*G05F 5/00* (2006.01)
*G05F 1/455* (2006.01)
*H05B 37/02* (2006.01)
*G05F 3/02* (2006.01)
*G05F 1/10* (2006.01)
*H05B 33/08* (2006.01)

(52) U.S. Cl.
CPC *G05F 1/455* (2013.01); *G05F 1/10* (2013.01); *G05F 3/02* (2013.01); *H05B 33/0815* (2013.01); *H05B 37/02* (2013.01); *Y02B 20/346* (2013.01)

(58) Field of Classification Search
CPC ............ G05F 1/10; G05F 1/455; G05F 3/02; G05F 5/00
USPC .................. 323/268, 271, 282, 284, 285, 299
See application file for complete search history.

(56) References Cited

U.S. PATENT DOCUMENTS

| 5,680,036 | A | | 10/1997 | Faulk | |
|---|---|---|---|---|---|
| 5,889,393 | A | * | 3/1999 | Wrathall | 323/282 |
| RE39,065 | E | * | 4/2006 | Nelson | 323/284 |
| 7,202,653 | B2 | | 4/2007 | Pai | |
| 7,453,251 | B1 | * | 11/2008 | Mehas et al. | 323/299 |

* cited by examiner

*Primary Examiner* — Matthew Nguyen
(74) *Attorney, Agent, or Firm* — Tung & Associates

(57) ABSTRACT

The present invention discloses a switching regulator and a control circuit and a control method thereof. The switching regulator generates a compensation signal according to a feedback signal, and generates a driving signal according to the compensation signal, to control a power stage for converting an input voltage to an output voltage. The compensation signal is adjusted according to the input voltage, such that when the input voltage is equal to or lower than a predetermined level, the compensation signal is kept at a predetermined value.

8 Claims, 5 Drawing Sheets

SWITCHING REGULATOR AND CONTROL CIRCUIT AND CONTROL METHOD THEREOF

CROSS REFERENCE

The present invention claims priority to U.S. provisional application 61/581,712, filed on Dec. 30, 2011.

BACKGROUND OF THE INVENTION

1. Field of Invention

The present invention relates to a switching regulator, and a control circuit and method for controlling a switching regulator. Particularly, it relates to such switching regulator, control circuit, and control method which suppresses noises around valleys of a compensation signal.

2. Description of Related Art

FIG. 1A shows a schematic diagram of a typical buck switching regulator 1. As shown in FIG. 1A, the buck switching regulator 1 includes a power stage 11 and a control circuit 13. The power stage 11 switches a switch Q according to a driving signal to convert an input voltage Vin to an output voltage Vout. The control circuit 13 generates the driving signal according to a feedback signal FB. Referring to FIG. 1B, the control circuit 13 includes a driver gate circuit 131, an error amplifier circuit 133 and a comparator 135. The error amplifier circuit 133 compares the feedback signal with a reference signal Vref, and generates a compensation signal Vc according to the comparison result. As shown in FIG. 1A, the feedback signal FB is obtained from the voltage across a resistor R2, which is a divided voltage by resistors R1 and R2 connected in series between the output voltage Vout and ground level. The comparator 135 compares the compensation signal Vc with a current sense signal CS which is related to an inductor current IL in the power stage 11, and the comparator 135 generates a pulse width modulation (PWM) signal according to the comparison result. The PWM signal is converted to a driving signal by the driver gate circuit 131, to operate the power switch Q. The power stage 11 can be one of the synchronous and asynchronous buck, boost, inverting, buck-boost, and inverting-boost conversion circuits shown in FIGS. 2A-2J.

Referring to FIG. 1C, wherein the buck switching regulator 1 as shown in FIG. 1A is taken as an example, when the input voltage Vin is a rectified AC signal, the ideal waveform of the input voltage Vin is a semi-sinusoidal voltage signal as shown on top of FIG. 1C; but in an actual condition, the waveform of the input voltage Vin is as the second waveform shown in FIG. 1C, referred to as "valley-cut semi-sinusoidal voltage signal" in this invention, wherein the lowest level of the input voltage Vin is not lower than the output voltage Vout. Therefore, corresponding waveforms of the inductor current IL and the compensation signal Vc are as shown by the third and fourth waveforms, respectively. When the input voltage Vin is not higher than the output voltage Vout, because the feedback signal FB or the current sense signal CS is equal to or near zero, and due to the reverse amplification effect of the error amplifier circuit 133, the waveform of the compensation signal Vc is distorted with noises around valleys of the compensation signal Vc (as shown in the figure, the noises are indicated by dashed circles), adversely impacting the power factor (PF) and the total harmonic distortion (THD).

Besides, in the applications of driving a light emitting diode (LED) circuit wherein a tri-electrode AC switch (TRIAC) is used, because the TRIAC needs to be triggered, the trigger action also enhances the noises around valleys of the compensation signal Vc. Furthermore, in the applications of frequency modulated switching regulators, the frequency should be limited under a certain level lest the inductor current IL will not decrease, so the compensation signal Vc needs to be reset at proper timings to limit the operation frequency. In other types of power conversion circuits, noises often also exist around the valleys of the compensation signal Vc, or it is required to periodically adjust or reset the compensation signal Vc.

In view of the foregoing, the present invention provides a switching regulator, and a control circuit and method for controlling a switching regulator, which is capable of adjusting the compensation signal Vc to suppress the noises around the valleys of the compensation signal Vc, such that the power factor PF and the total harmonic distortion THD are improved.

SUMMARY OF THE INVENTION

A first objective of the present invention is to provide a switching regulator.

A second objective of the present invention is to provide a control circuit for controlling a switching regulator.

A third objective of the present invention is to provide a control method for controlling a switching regulator.

To achieve one or more of the above and other objectives, from one perspective, the present invention provides a switching regulator for converting an input voltage to an output voltage, including: a power stage for switching at least one power switch therein according to a driving signal to convert the input voltage to the output voltage; a driver circuit for generating a compensation signal according to a feedback signal related to the output voltage, and generating the driving signal according to the compensation signal; and a compensation circuit coupled to the driver circuit, for adjusting the compensation signal according to the input voltage, wherein when the input voltage is equal to or lower than a predetermined level, the compensation signal is kept at a predetermined value by the compensation circuit.

From another perspective, the present invention provides a control circuit for controlling a power stage to convert an input voltage to an output voltage, the control circuit including: a driver circuit for generating a compensation signal according to a feedback signal related to the output voltage, and generating a driving signal according to the compensation signal; and a compensation circuit coupled to the driver circuit, for adjusting the compensation signal according to the input voltage, wherein when the input voltage is equal to or lower than a predetermined level, the compensation signal is kept at a predetermined value by the compensation circuit.

In one preferable embodiment, the compensation circuit includes: a level detection circuit for detecting the input voltage and generating a detection signal; a voltage source circuit for generating a voltage level; and an conduction control circuit, which is coupled between the compensation signal and the voltage level provided by the voltage source circuit, wherein when the detection signal indicates that the input voltage is equal to or lower than the predetermined level, the conduction control circuit is conductive, such that a level of the compensation signal is controlled by the voltage level provided by the voltage source circuit.

In one preferable embodiment, the level detection circuit includes a voltage divider circuit, which is coupled between the input voltage and ground level. The voltage source circuit may include a capacitor. The conduction control circuit may include a diode, which has a forward terminal coupled to the compensation signal, and a reverse terminal coupled to the level detection circuit and the voltage source circuit.

From another perspective, the present invention provides a control method of a switching regulator, including: controlling a power stage to convert an input voltage to an output voltage according to a driving signal; generating a compensation signal according to a feedback signal related to the output voltage, and generating the driving signal according to the compensation signal; and adjusting the compensation signal according to the input voltage, wherein when the input voltage is equal to or lower than a predetermined level, the compensation signal is kept at a predetermined value.

In one preferable embodiment, the step of the adjusting the compensation signal includes: detecting the input voltage; and when the input voltage is equal to or lower than a predetermined level, controlling the compensation signal such that the compensation signal is kept at a stable level.

The objectives, technical details, features, and effects of the present invention will be better understood with regard to the detailed description of the embodiments below.

DESCRIPTION OF THE PREFERRED
EMBODIMENTS

Figure 1A:
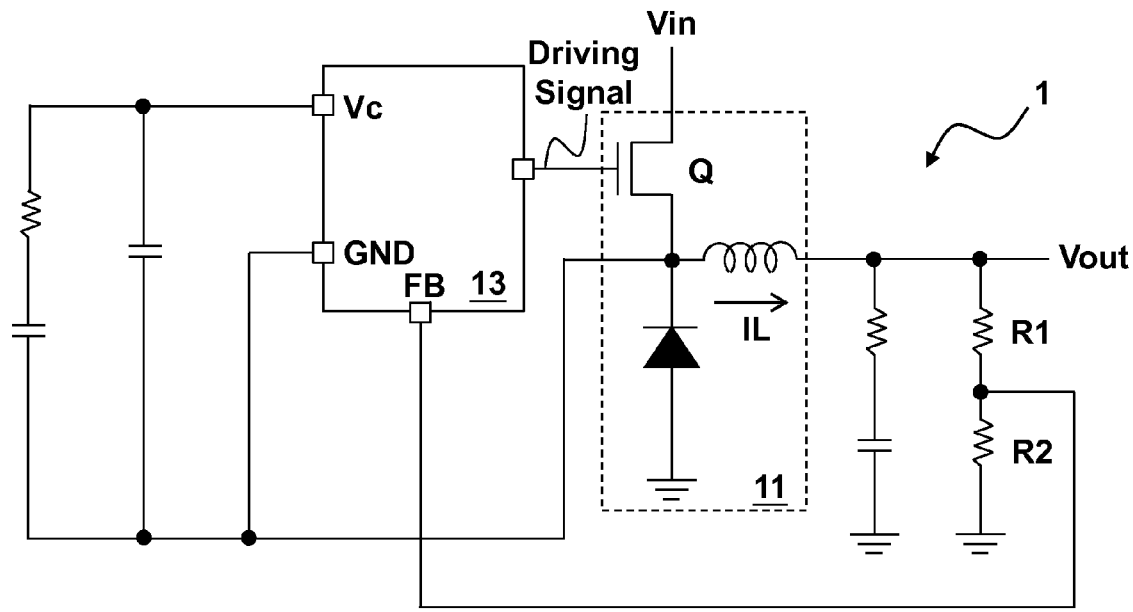
FIG. 1A shows a schematic diagram of a typical buck switching regulator 1.
Figure 1B:
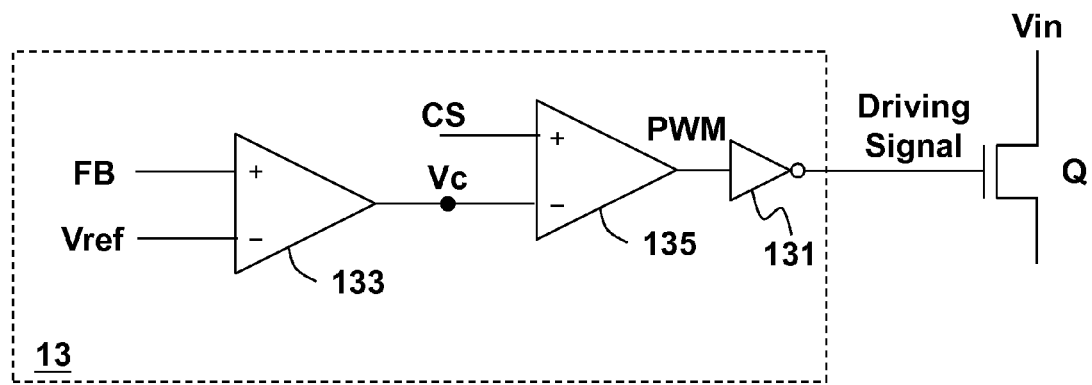
FIG. 1B is a schematic diagram showing an example of a control circuit 13.
Figure 1C:
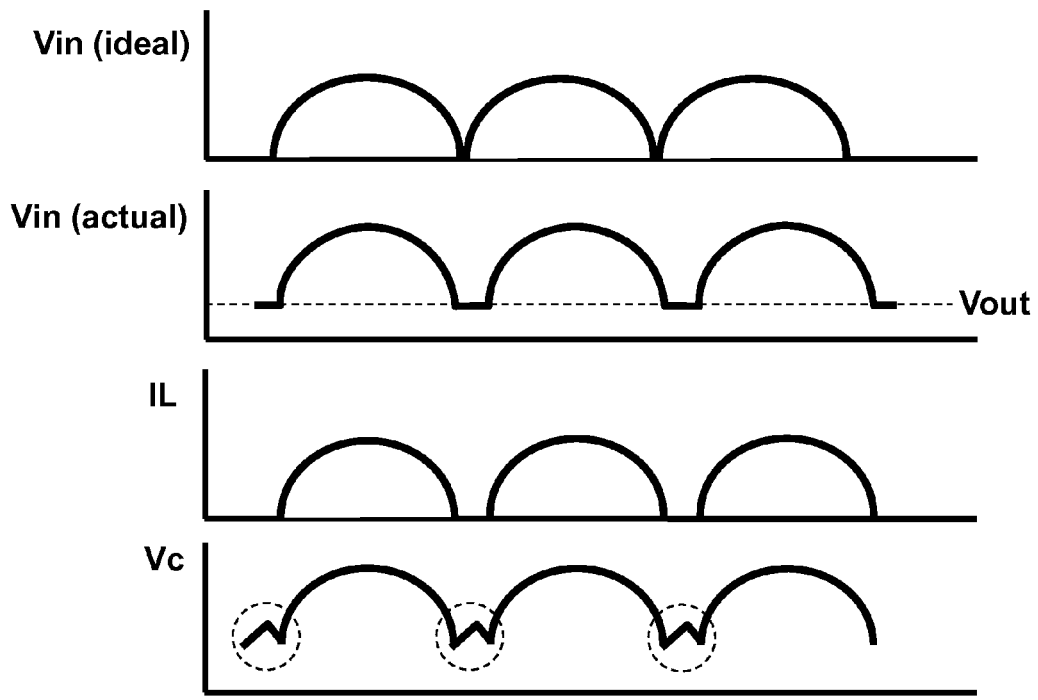
FIG. 1C shows the waveforms of the signals in FIG. 1A.
Figure 2A:
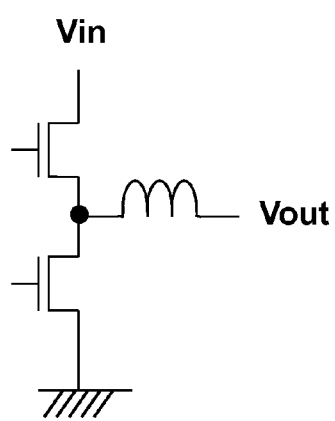
FIGS. 2A-2J show synchronous and asynchronous buck, boost, inverting, buck-boost, and inverting-boost conversion circuits.
Figure 2B:
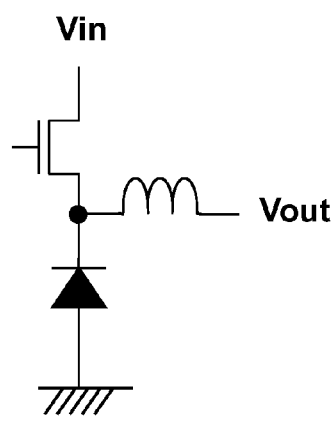
Figure 2C:
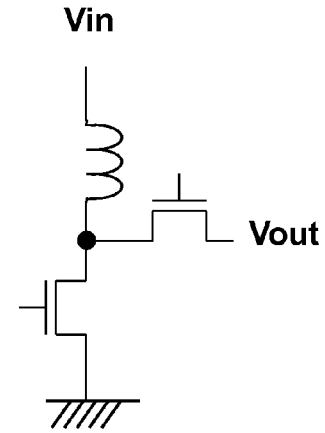
Figure 2D:
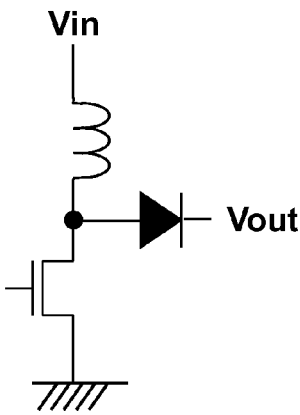
Figure 2E:
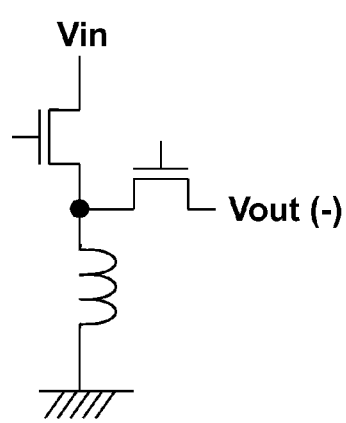
Figure 2F:
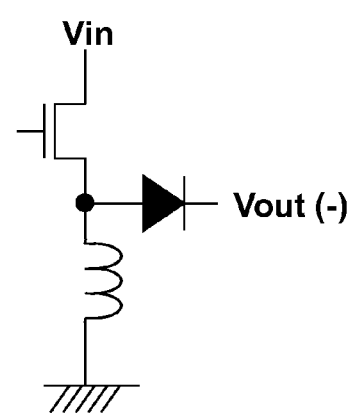
Figure 2G:
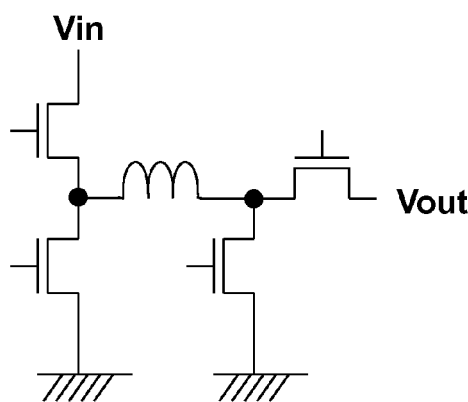
Figure 2H:
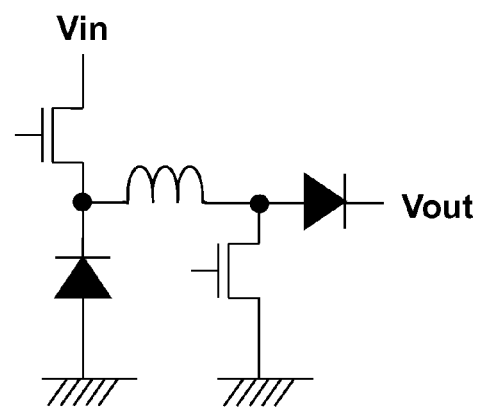
Figure 2I:
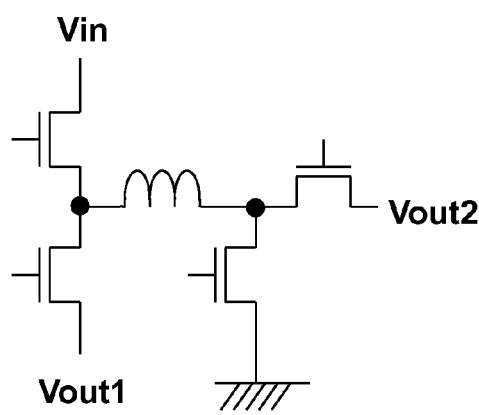
Figure 2J:
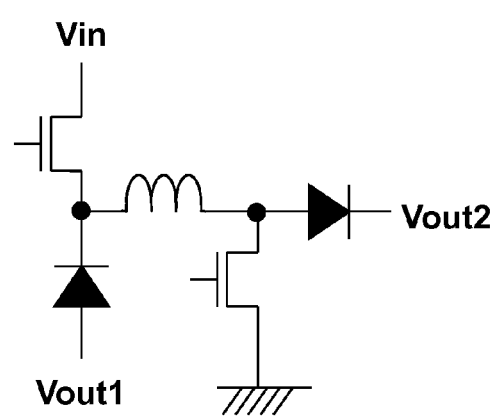
Figure 3:
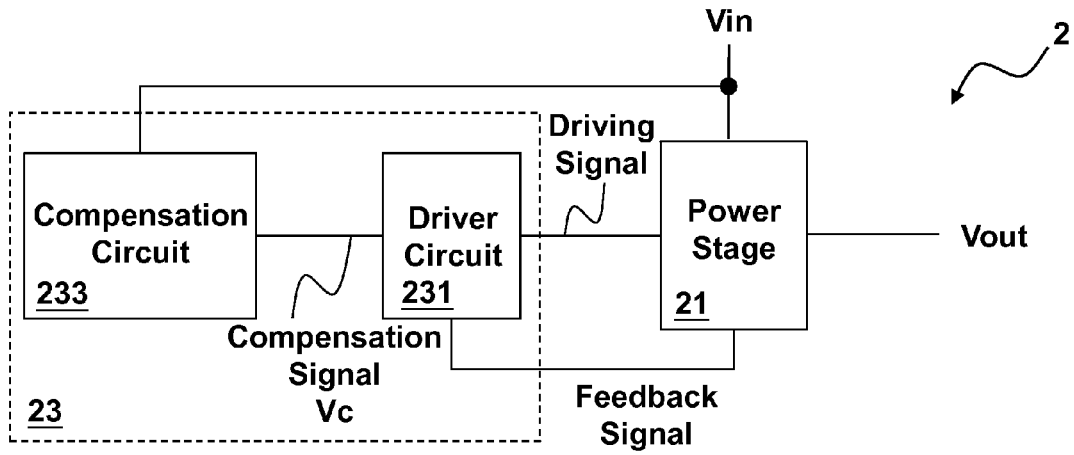
FIG. 3 shows a first embodiment of the present invention.

FIG. 3 shows a first embodiment of the present invention. This embodiment shows an application structure according to the present invention. As shown in FIG. 3, the switching regulator 2 includes a power stage 21 and a control circuit 23. The power stage 21 switches at least one power switch therein (referring to FIGS. 2A-2J and FIG. 6) according to a driving signal to convert an input voltage Vin to an output voltage Vout. The control circuit 23 generates the driving signal according to a feedback signal which is related to the output voltage Vout. This embodiment is different from the prior art in that, besides generating the driving signal according to the feedback signal, the control circuit 23 adjusts a compensation signal Vc according to the input voltage Vin such that the problem in the prior art may be solved. The control circuit 23 includes a driver circuit 231 and a compensation circuit 233. The driver circuit 231 generates the compensation signal Vc according to the feedback signal, and generates the driving signal according to the compensation signal Vc. The driver circuit 231 may generate the compensation signal Vc and the driving signal for example in a way similar to that shown in FIG. 1B, but not limited thereto; for example, the current sense signal CS shown in FIG. 1B may be replaced by a saw-tooth signal in another form. The compensation circuit 233 is coupled to the driver circuit 231, and it adjusts the compensation signal Vc according to the input voltage Vin, wherein when the input voltage Vin is equal to or lower than a predetermined level, the compensation signal Vc is kept at a predetermined value by the compensation circuit 233.

Figure 4:
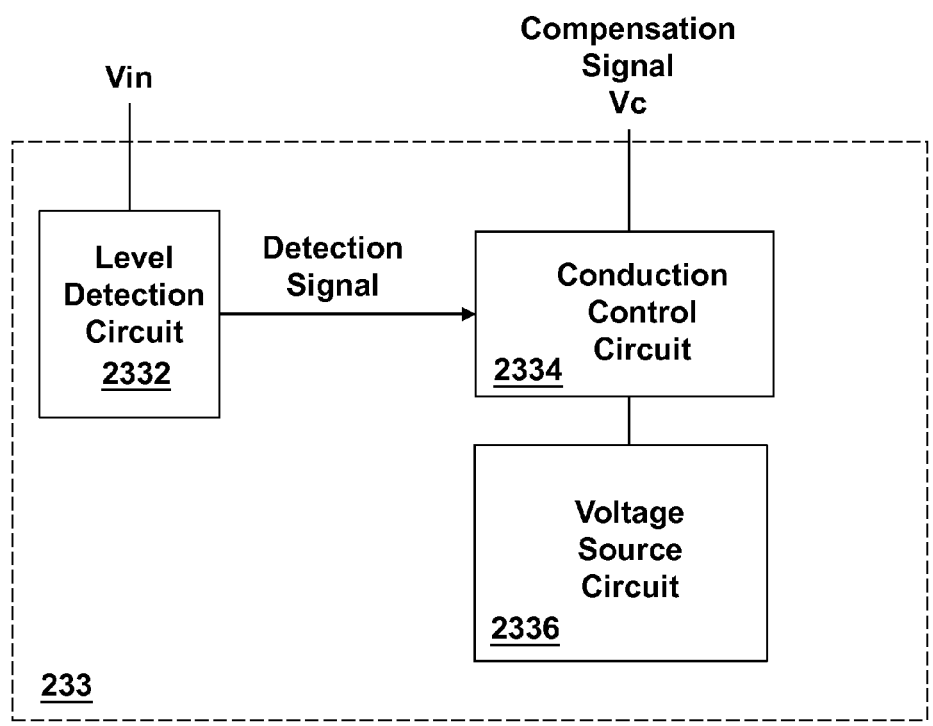
FIG. 4 shows an embodiment of the compensation circuit.
Figure 5:
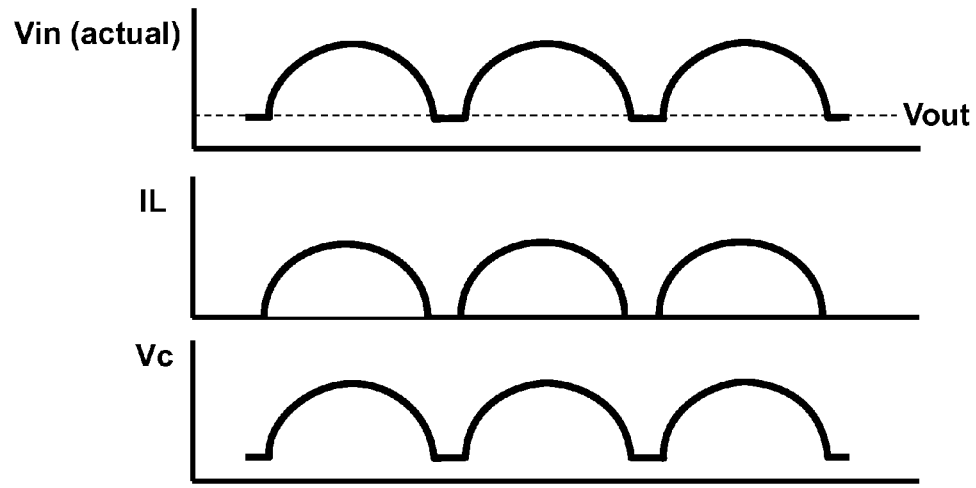
FIG. 5 shows that the compensation signal Vc of the present invention has a better waveform.

FIG. 4 shows an embodiment of the compensation circuit 233 according to the present invention. The compensation circuit 233 includes a level detection circuit 2332, a conduction control circuit 2334, and a voltage source circuit 2336. The level detection circuit 2332 detects a level of the input voltage Vin, and generates a detection signal. When the level detection circuit 233 detects that the input voltage Vin is equal to (or lower than) a predetermined level (such as a level at or near the valley of the input voltage Vin), the detection signal triggers the conduction control circuit 2334 to be conductive, such that the compensation signal Vc is coupled to the voltage source circuit 2336, and the level of the compensation signal Vc is adjusted to a level which is controlled by the voltage source circuit 2336. As shown in FIG. 5, the aforementioned adjustment of the compensation signal Vc can stabilize the valley of the compensation signal Vc at the level which is controlled by the voltage source circuit 2336 without noises as the prior art, and besides, the adjustment also advantageously resets the compensation signal Vc to a known level periodically. On the other hand, when the input voltage Vin is higher than the predetermined level, the conduction control circuit 2334 turns OFF, such that the compensation signal Vc is not controlled by the voltage source circuit 2336.

Figure 6:
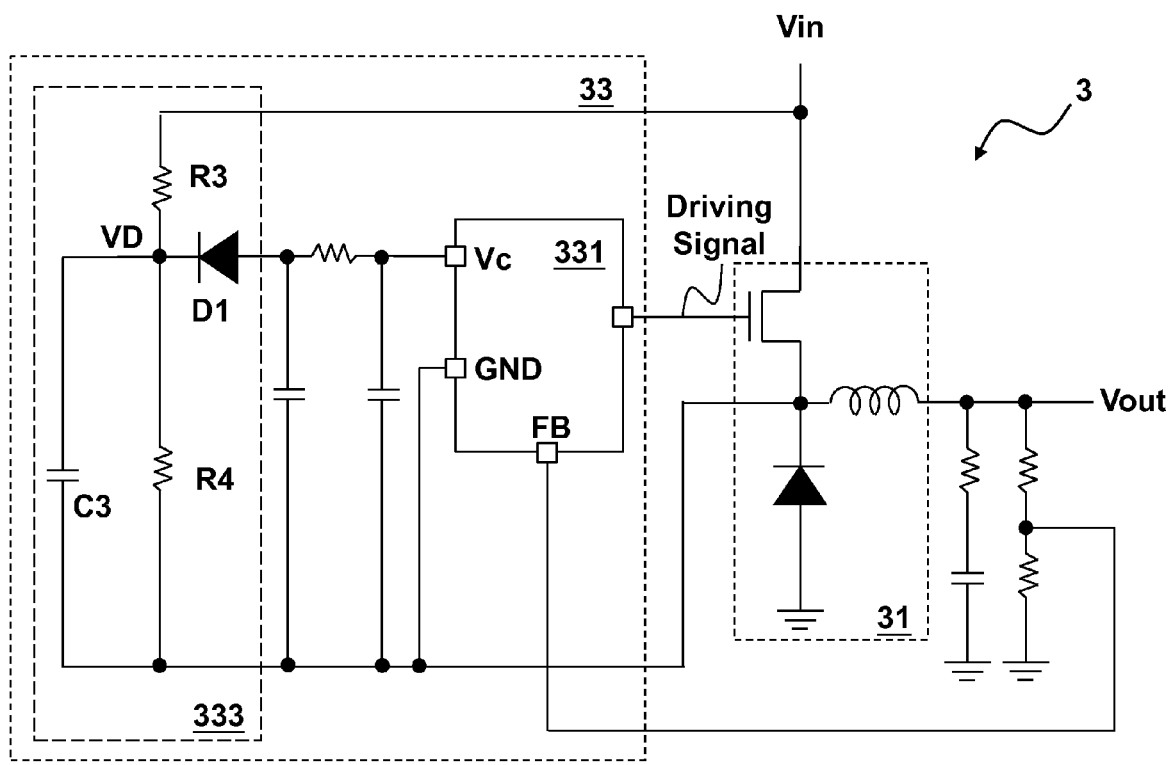
FIG. 6 shows a specific embodiment of the present invention.

FIG. 6 shows a specific embodiment of the present invention. As shown in the figure, a switching regulator 3 includes a power stage 31 and a control circuit 33. The power stage 31 is shown as a buck conversion circuit for example, so the switching regulator 3 is a buck switching regulator; however, the present invention is not limited to this. The switching regulator 3 switches at least one power switch therein according to a driving signal to convert the input voltage Vin to the output voltage Vout. The power stage 31 may be other types of conversion circuits such as the ones shown in FIGS. 2A-2J. In this embodiment, a control circuit 33 includes a driver circuit 331 and a compensation circuit 333 (Another resistor and other capacitors are shown in the figure to show a preferable embodiment, but not to limit the scope of the present invention. These resistor and capacitors are not absolutely necessary). The driver circuit 331 generates a compensation signal Vc according to a feedback signal FB (for example but not limited to a divided voltage of the output voltage Vout as shown in the figure), and generates a driving signal according to the compensation signal Vc. The compensation circuit 333 adjusts the compensation signal Vc according to the input voltage Vin. As shown in the figure, in this embodiment, the compensation circuit 333 includes a voltage divider circuit, a diode D1 and a capacitor C3. The voltage divider circuit for example includes two resistors R3 and R4 connected in series and coupled between the input voltage Vin and the ground level. The voltage divider circuit formed by resistors R3 and R4 has a function of detecting the level of the input voltage Vin. The diode D1 has a function of conduction control. The capacitor C3 has a function of providing a stabilized voltage, as a voltage source. When the input voltage Vin decreases to or below a predetermined level, such that the voltage level at the node VD between the resistors R3 and R4 plus the forward bias voltage (Vf) across the diode D1 is equal to or lower than the level of the compensation signal Vc at that moment (VD+Vf≤Vc), the diode D1 becomes conductive, and the compensation signal Vc charges the capacitor C3 until the excess voltage of the compensation signal Vc is released to thereby reset the compensation signal Vc to, and keep the compensation signal Vc at, a level which is controlled by the capacitor C3 (the level being equal to the voltage of the capacitor C3 plus the forward bias voltage Vf across the diode D1). Thus, the noises around the valleys of the compensation signal Vc are removed, and the compensation signal Vc can be reset periodically at proper timings. On the other hand, when the input voltage Vin is higher than the predetermined level, the diode D1 is not conductive, and the compensation signal Vc is not controlled by the capacitor C3.

The circuit shown in FIG. 6 is only one of the embodiments. The devices in this embodiment may be modified in various ways. For example, the voltage divider circuit formed by the resistors R3 and R4 may be replaced by other circuits which can detect the level of the input voltage Vin; for another example, the diode D1 may be replaced by other unidirectional devices; for another example, the capacitor C3 may be replaced by a constant voltage node with current sinking capability.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention. For example, a device which does not substantially influence the primary function of a signal can be inserted between any two devices in the shown embodiments, such as a switch or the like. For another example, the positive and negative input terminals of the error amplifiers or comparators are interchangeable, with corresponding amendment of the circuits processing these signals. In view of the foregoing, the spirit of the present invention should cover all such and other modifications and variations, which should be interpreted to fall within the scope of the following claims and their equivalents.

What is claimed is:

1. A switching regulator for converting an input voltage to an output voltage, comprising:
    a power stage for switching at least one power switch therein according to a driving signal to convert the input voltage to the output voltage;
    a driver circuit for generating a compensation signal according to a feedback signal related to the output voltage, and generating the driving signal according to the compensation signal; and
    a compensation circuit coupled to the driver circuit, for adjusting the compensation signal according to the input voltage, wherein when the input voltage is equal to or lower than a predetermined level, the compensation signal is kept at a predetermined value by the compensation circuit;
    wherein the compensation circuit includes:
    a level detection circuit for detecting the input voltage and generating a detection signal;
    a voltage source circuit for providing a voltage level; and
    a conduction control circuit, which is coupled between the compensation signal and the voltage level provided by the voltage source circuit, wherein when the detection signal indicates that the input voltage is equal to or lower than the predetermined level, the conduction control circuit is conductive, such that a level of the compensation signal is controlled by the voltage level provided by the voltage source circuit.

2. The switching regulator of claim 1, wherein the level detection circuit includes a voltage divider circuit, which is coupled between the input voltage and a ground level.

3. The switching regulator of claim 1, wherein the voltage source circuit includes a capacitor.

4. The switching regulator of claim 1, wherein the conduction control circuit includes a diode, which has a forward terminal coupled to the compensation signal, and a reverse terminal coupled to the level detection circuit and the voltage source circuit.

5. A control circuit of a switching regulator for controlling a power stage to convert an input voltage to an output voltage, the control circuit comprising:
    a driver circuit for generating a compensation signal according to a feedback signal related to the output voltage, and generating a driving signal according to the compensation signal; and
    a compensation circuit coupled to the driver circuit, for adjusting the compensation signal according to the input voltage, wherein when the input voltage is equal to or lower than a predetermined level, the compensation signal is kept at a predetermined value by the compensation circuit;
    wherein the compensation circuit includes:
    a level detection circuit for detecting the input voltage and generating a detection signal;
    a voltage source circuit for providing a voltage level; and
    an conduction control circuit, which is coupled between the compensation signal and the voltage level provided by the voltage source circuit, wherein when the detection signal indicates that the input voltage is equal to or lower than the predetermined level, the conduction control circuit is conductive, such that a level of the compensation signal is controlled by the voltage level provided by the voltage source circuit.

6. The control circuit of claim 5, wherein the level detection circuit includes a voltage divider circuit, which is coupled between the input voltage and a ground level.

7. The control circuit of claim 5, wherein the voltage source circuit includes a capacitor.

8. The control circuit of claim 5, wherein the conduction control circuit includes a diode, which has a forward terminal coupled to the compensation signal, and a reverse terminal coupled to the level detection circuit and the voltage source circuit.

* * * * *